April 21, 1964     M. STRASSBERG     3,129,986
DOUBLE-THRUST BEARING
Filed Aug. 13, 1962
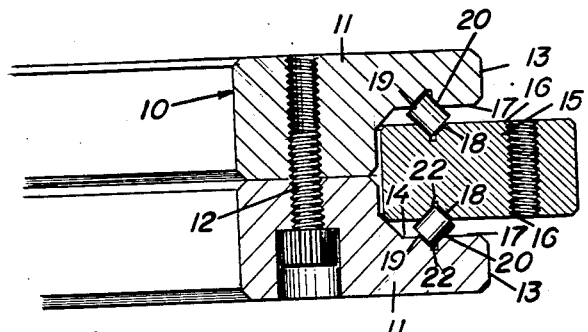
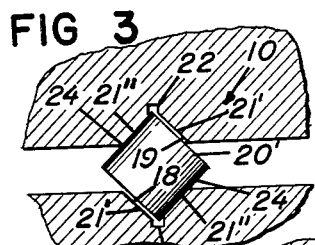
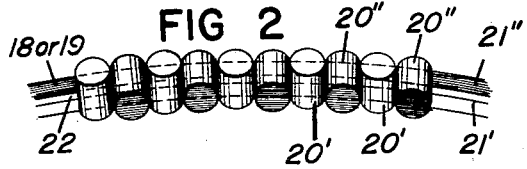
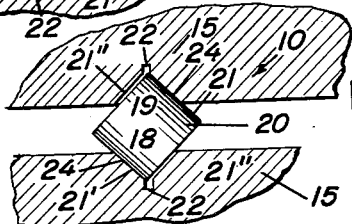
INVENTOR,
Maximilien Strassberg
by *Irwin S. Thompson*
ATTORNEY

United States Patent Office 3,129,986
Patented Apr. 21, 1964

3,129,986
DOUBLE-THRUST BEARING
Maximilien Strassberg, Joinville, France
(4 Rue de Voize, Neuilly-Plaisance, France)
Filed Aug. 13, 1962, Ser. No. 216,670
Claims priority, application France Sept. 2, 1961
1 Claim. (Cl. 308—222)

This invention relates to bearings for elements and in particular to bearings of the double thrust type which permit rotation of a rotating element without axial play in either direction. Such bearings are used, for example, for supporting the spindles of machine tools, rotating crane platforms or other lifting equipment, and in a general way for any relatively heavy element mounted rotatably on a fixed support.

Double thrust bearings used up to the present time are often complex and wear very quickly.

It is a main object of the invention to provide a double thrust bearing which is of relatively simple design, which is very sturdy, is capable of supporting considerable axial and radial loads, and which is able to operate at high speed without risk of parasitic vibrations.

According to the invention there is provided a double thrust bearing comprising a ring having a peripheral U-shaped slot opening radially therefrom, an annular crown located in said slot to be co-axial with the ring with opposite sides of the crown respectively facing opposite sides of the slot, said facing sides of the slot and crown each including a circular groove having a section in the shape of a right-angled isosceles triangle with the grooves in the facing sides aligned and forming a circular channel of square section, and a series of cylindrical rollers located in each of said channels with the axes of alternate rollers in each channel perpendicular one to one face of one of the grooves forming the channel and one to the other face of the same groove, the diameter of each roller being equal to the length of a side of the square section of the channel and the axial height of each roller being slightly less than the length of a side of the square section of the channel.

In a bearing as just set forth, each roller bears on the ring and on the crown by two diametrally opposite generatrices which are respectively in contact with two opposite faces of the channel in which the roller is placed, while the roller has a slight axial clearance in the said channel. The roller can thus roll freely and perfectly in the channel during a relative rotation between the ring and the crown.

As will be understood, the forces applied between the crown and the ring are carried over a multiplicity of linear surfaces extending along the generatrices of contact. The total area of these linear surfaces is relatively great, thus enabling the bearing to withstand considerable loads without deterioration.

It will also be appreciated that because of the alternate crossing arrangement of the rollers, axial play of the crown in relation to the ring is eliminated in both directions because the rollers in rolling contact with one face of a groove prevent the axial displacement of the crown in one direction, while the rollers in rolling contact with the other face of the groove prevent axial displacement of the crown in the other direction. As will be understood, radial play is likewise eliminated for the same reason.

Further a bearing according to the invention can operate at very high speeds without risk of parasitic vibrations, because, as the result of the cylindrical shape of the rollers it is practically impossible for them to come into resonance during operation.

In order that the invention may be clearly understood one embodiment thereof will now be described, by way of example, with reference to the accompanying drawings, in which:

FIGURE 1 shows an axial half-section of a double thrust bearing according to the invention, FIGURE 2 illustrates the arrangement of cylindrical rollers in a groove in the ring or crown of the bearing, FIGURES 3 and 4 illustrate to an enlarged scale two sections of one of the channels receiving the rollers, these sections being taken respectively in the axial plane of two successive rollers, and FIGURE 5 illustrates the bearing in FIGURE 1, in perspective, with some parts cut away.

Referring to the drawings, a bearing according to the invention comprises a ring 10 formed by two annular end plates 11 rigidly secured to one another by screws 12, and providing between their outer edges 13 a peripheral slot 14 having a U-shaped section which opens radially and in which is located an annular crown 15, co-axial with the end plates 11, and having two transverse faces 16 disposed respectively opposite the two lateral faces 17 of the slot 14. A circular groove 18 having a section in the shape of a right-angled isosceles triangle is provided in each transverse face 16 of the crown 15; a circular groove 19, likewise having a section in the shape of a right-angled isosceles triangle, is also provided in each lateral face 17 of the slot 14 formed by the end plates 11. The bottom of each groove has a small slot 22 cut in it. The sides of each groove 18, if extended, define with the sides, also if extended, of the groove 19 facing it a channel 23 of square section (FIGURE 5). Each of the two channels thus provided on each side of the crown 15 contains a series of cylindrical rollers 20 comprising rollers 20′ the axis of each of which is disposed perpendicularly to one of the faces 21′ of one of the grooves 18 or 19 (FIGURE 2), alternating with rollers 20″ the axis of each of which is disposed perpendicularly to the other face 21″ of the same groove. The diameter of all the rollers 20 is selected to be equal to a side, that is to the extended face 21′ or 21″, of the square section channel 23 receiving them (FIGURES 3 and 4), while their axial height is selected to be slightly smaller than the side of the square section channel.

As will be understood, each roller 20 (20′ or 20″) bears on the ring 10 and the crown 15 by two diametrally opposite generatrices 24 (FIGURES 3 and 4), which are respectively in contact with two opposite faces of the channel 23 of square section (FIGURE 5) formed between the ring 10 and the crown 15, and has slight axial clearance in the channel 23. Each roller 20 can thus roll freely and perfectly in the channel 23 during relative rotation between the ring and crown.

The forces applied between the ring 10 and the crown 15 are carried over a multiplicity of linear surfaces extending along the generatrices of contact 24 (FIGURES 3 and 4). The total area of these linear surfaces is relatively great, thus enabling the bearing to withstand considerable loads without deterioration.

Because of the alternate crossing arrangement of the rollers 20, the axial play of the crown 15 in relation to the ring 10 is eliminated because the rollers 20′ in rolling contact with one face of the groove 18 prevent axial displacement of the crown 15 in one direction, while the rollers 20″ in rolling contact with the other face of the same groove 18 prevent axial displacement of the crown 15 in the other direction. Radial play of the crown 15 is likewise eliminated for the same reasons.

I claim:

A double-thrust bearing comprising a ring having a U-shaped slot opening radially outwardly therefrom, an annular crown located in said slot coaxial with the ring with parallel opposite flat sides of the crown respectively facing in parallelism parallel opposite flat sides of the slot, said facing sides of the slot and crown each including a circular groove having a section in the shape of a right-angled isosceles triangle whose bisector line is parallel to the axis of rotation of the bearing, the grooves in the facing sides being vertically aligned and forming between the ring and the crown two circular channels of square section, and two series of cylindrical rollers being disposed in said channels, the axes of alternate rollers in each channel being perpendicular one to one face of one of the grooves forming the channel and one to the other face of the same groove, the diameter of each roller being equal to the length of a side of the square section of the channel and the axial height of each roller being slightly less than the length of a side of the square section of the channel.

References Cited in the file of this patent

UNITED STATES PATENTS

| | | |
|---|---|---|
| 2,430,359 | Messinger | Nov. 4, 1947 |
| 2,643,920 | Olszewski | June 30, 1953 |
| 2,708,767 | Dean | May 24, 1955 |
| 2,823,083 | Welton | Feb. 11, 1958 |
| 3,002,429 | Franke | Oct. 3, 1961 |

FOREIGN PATENTS

| | | |
|---|---|---|
| 1,041,307 | Germany | Oct. 16, 1958 |